(12) United States Patent
Fu

(10) Patent No.: US 7,014,115 B2
(45) Date of Patent: Mar. 21, 2006

(54) MEMS SCANNING MIRROR WITH DISTRIBUTED HINGES AND MULTIPLE SUPPORT ATTACHMENTS

(75) Inventor: Yee-Chung Fu, Fremont, CA (US)

(73) Assignee: Advanced Nano Systems, Inc., Fremont, CA (US)

( * ) Notice: Subject to any disclaimer, the term of this patent is extended or adjusted under 35 U.S.C. 154(b) by 0 days.

(21) Appl. No.: 10/683,962

(22) Filed: Oct. 10, 2003

(65) Prior Publication Data

US 2005/0045727 A1    Mar. 3, 2005

Related U.S. Application Data

(63) Continuation of application No. 10/648,551, filed on Aug. 25, 2003, now abandoned.

(51) Int. Cl.
*G06K 7/10* (2006.01)

(52) U.S. Cl. .................... 235/454; 216/2; 310/309; 359/214; 359/224; 359/298

(58) Field of Classification Search ............... 235/454, 235/462.36; 216/2; 310/309; 359/214, 359/298

See application file for complete search history.

(56) References Cited

U.S. PATENT DOCUMENTS

| | | | | |
|---|---|---|---|---|
| 5,428,259 | A * | 6/1995 | Suzuki | 310/309 |
| 6,088,145 | A | 7/2000 | Dickensheets et al. | 359/196 |
| 6,155,490 | A | 12/2000 | Ackley | 235/472.01 |
| 6,360,035 | B1 | 3/2002 | Hurtz, Jr. et al. | |
| 6,465,929 | B1 * | 10/2002 | Levitan et al. | 310/309 |
| 6,593,677 | B1 * | 7/2003 | Behin et al. | 310/309 |
| 6,628,041 | B1 * | 9/2003 | Lee et al. | 310/309 |
| 6,686,639 | B1 * | 2/2004 | Tsai | 257/415 |
| 6,758,983 | B1 * | 7/2004 | Conant et al. | 216/2 |
| 6,795,225 | B1 * | 9/2004 | Tsuboi et al. | 359/224 |
| 2002/0064192 | A1 | 5/2002 | Missey et al. | |
| 2003/0007262 | A1 | 1/2003 | Tsuboi et al. | |

FOREIGN PATENT DOCUMENTS

| | | |
|---|---|---|
| DE | 199 63 382 A1 | 7/2001 |
| EP | 0 754 958 A2 | 1/1997 |
| WO | WO 01/53872 A1 | 7/2001 |
| WO | WO 02/059942 A2 | 8/2002 |

OTHER PUBLICATIONS

Robert A. Conant et al., "A Flat High-Frequency Scanning Micromirror", Berkeley Sensor & Actuator Center, University of California, Berkeley, Berkeley, CA, 4 pages.

(Continued)

*Primary Examiner*—Diane I. Lee
*Assistant Examiner*—Seung H Lee
(74) *Attorney, Agent, or Firm*—Patent Law Group LLP; David C. Hsia

(57) ABSTRACT

A MEMS scanning mirror device includes a scanning mirror, rotational comb teeth, stationary comb teeth, distributed serpentine springs, and anchors. The scanning mirror and the rotational comb teeth are driven by electrostatic force from stationary in-plane and/or out-of-plane teeth. The mirror is attached to the rotational comb structure by multiple support attachments. Multiple serpentine springs serve as the flexible hinges that link the movable structure to the stationary support structure.

27 Claims, 5 Drawing Sheets

OTHER PUBLICATIONS

Harald Schenk et al., Large Deflection Micromechanical Scanning Mirrors for Linear Scans and Patern Generation, IEEE Journal of Selected Topics in Quantum Electronics, vol. 6, No. 5, Sep./Oct. 2000, pp 715-721.

Pamela R. Patterson et al., "A Scanning Micromirror With angular Comb Drive Actuation", Electrical engineering Department, University of California at Los Angeles, Los Angeles, CA; Institute of Industrial Science, University of Tokyo, Tokyo, Japan, pp 544-547.

German Office Action including English translation, 9 pages.

* cited by examiner

MEMS SCANNING MIRROR WITH DISTRIBUTED HINGES AND MULTIPLE SUPPORT ATTACHMENTS

CROSS REFERENCE TO RELATED APPLICATIONS

This application is a continuation of U.S. patent application Ser. No. 10/648,551, filed on Aug. 25, 2003 now abandoned, and incorporated herein by reference.

FIELD OF INVENTION

This invention relates to micro-electro-mechanical system (MEMS) devices, and more particularly to MEMS scanning mirrors.

DESCRIPTION OF RELATED ART

Various electrostatic comb actuator designs for MEMS scanning mirrors have been proposed. The extensive applications of these devices include barcode readers, laser printers, confocal microscopes, projection displays, rear projection TVs, and wearable displays. Typically a MEMS scanning mirror is driven at its main resonance to achieve a large scan angle. To ensure a stable operation, it is crucial to ensure the mirror and its associated movable structure will vibrate in the desired mode shape at the lowest and main resonant frequency. In addition, this main frequency has to be separated far from other structural vibration frequencies to avoid potential coupling between the desired and the undesired mode shapes.

The undesired structural vibrations will increase the mirror dynamic deformation and result in degraded optical resolution. Furthermore, some of the structural vibration modes may cause the rotationally movable and stationary comb teeth to come into contact and break the actuator all together. Two or more structural vibration modes with close resonant frequencies may be coupled to produce high vibration amplitude that leads to hinge failure. Thus, an apparatus and a method are needed in the design of MEMS scanning mirrors to effectively improve the vibration stability at resonance, and to ensure optical resolution of these devices.

SUMMARY

In one embodiment of the invention, a MEMS scanning mirror device includes a scanning mirror, rotational comb teeth, stationary comb teeth, distributed serpentine springs, and anchors. The scanning mirror and the rotational comb teeth are driven by electrostatic force from stationary in-plane and/or out-of-plane teeth. The mirror is connected to the rotational comb structure by multiple support attachments. Multiple serpentine springs serve as the flexible hinges that link the movable structure to the stationary support structure.

DETAILED DESCRIPTION OF THE INVENTION

Figure 1A:
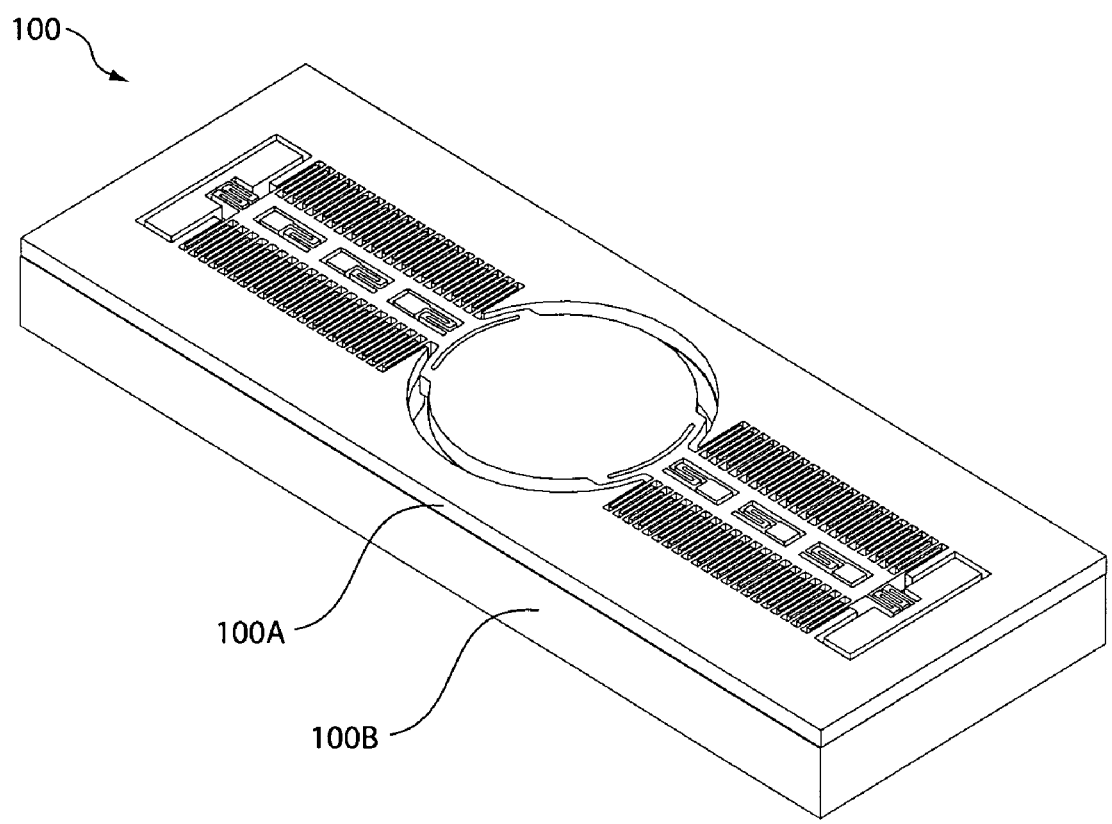
Figs. 1A, 1B, and 1C illustrate top views of the layers in a MEMS device in one embodiment of the invention.

FIG. 1A illustrates a MEMS scanning mirror device 100 in one embodiment of the invention. Device 100 includes a top layer 100A (FIG. 1B) and a bottom layer 100B (FIG. 1C).

Figure 1B:
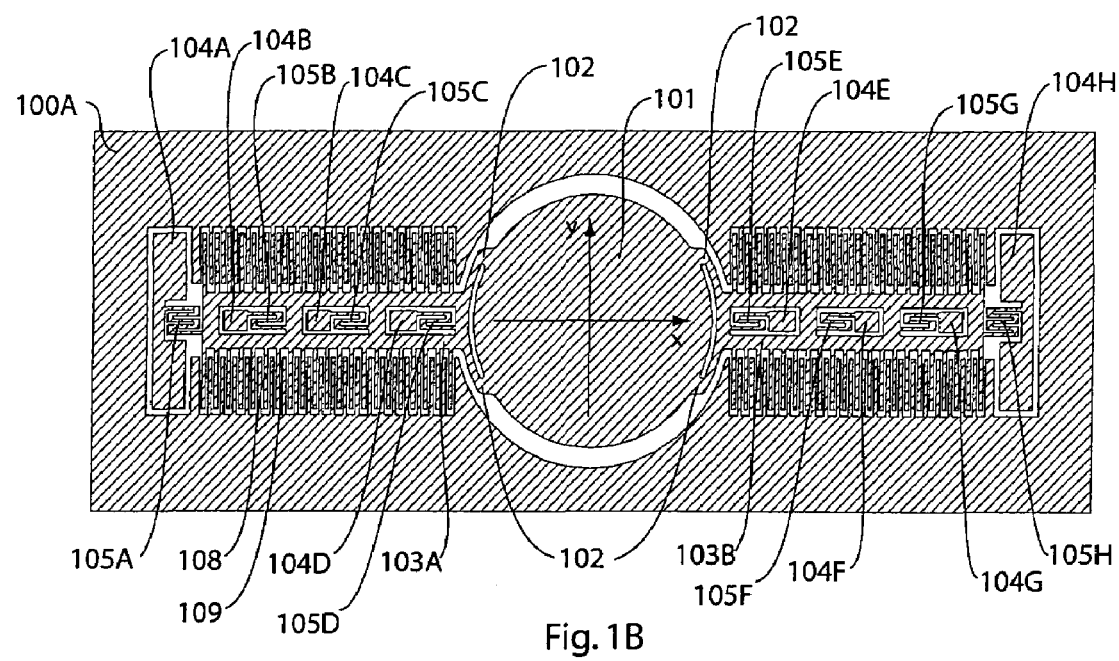
Figure 1C:
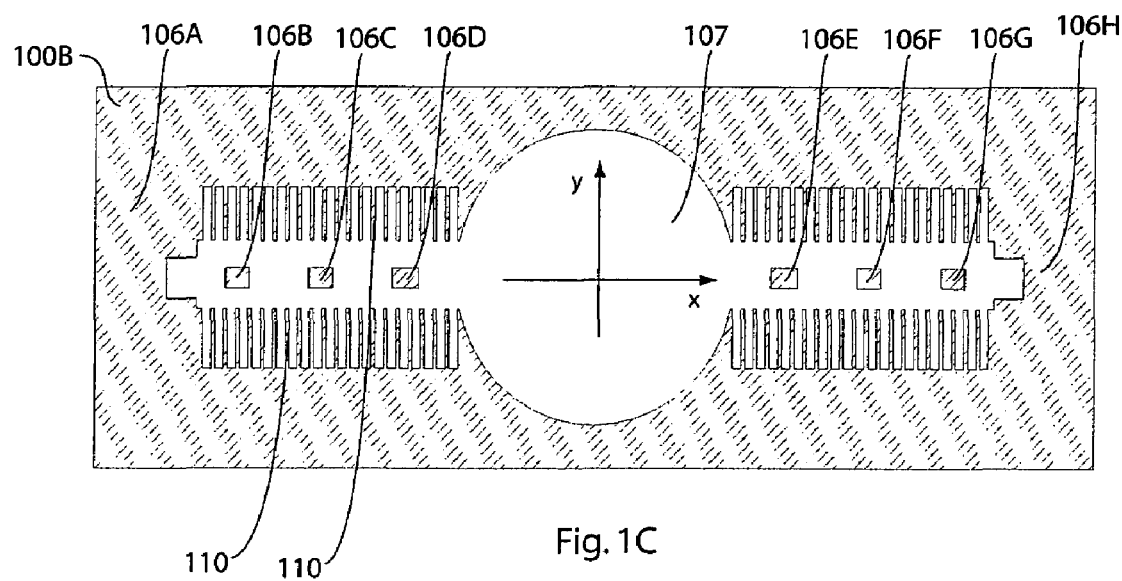

Referring to FIG. 1B, top layer 100A includes rotational comb teeth 108 that are connected on opposing sides of beam-like structures 103A and 103B. Proximal ends of beams 103A and 103B are connected by multiple support attachments 102 to opposing sides of a scanning mirror 101. In other words, each beam is connected at multiple locations to scanning mirror 101. The positions and the number of support attachments 102 are carefully chosen through finite element analysis to minimize dynamic deformation of scanning mirror 101. By reducing dynamic deformation of scanning mirror 101 with support attachments 102, the optical resolution of device 100 is improved.

Beams 103A and 103B are attached by eight serpentine springs/hinges 105A to 105H to bottom layer 100B (FIG. 1B) in a distributed manner along the rotational axis (e.g., the x-axis) of scanning mirror 101. Specifically, the distal end of beam 103A is connected by spring/hinge 105A to anchor 104A, and the distal end of beam 103B is connected by spring/hinge 105H to anchor 104H. Along their lengths, beam 103A is connected by springs/hinges 105B to 105D to corresponding anchors 104B to 104D, and beam 103B is connected by springs/hinges 105E to 105G to corresponding anchors 104E to 104G. In one embodiment, springs 105B to 105G are located within beams 103A and 103B. Anchors 104A to 104H are mounted to bottom layer 100B (FIG. 1C).

Top layer 100A may include stationary comb teeth 109. In one embodiment, stationary comb teeth 109 provide the electrostatic biasing force used to increase the driving efficiency of the movable structure by tuning its modal frequency. In another embodiment, stationary comb teeth 109 provide the electrostatic driving force to drive scanning mirror 101. In yet another embodiment, stationary comb teeth 109 provides both the electrostatic biasing force and the electrostatic driving force.

Referring to FIG. 1C, bottom layer 100B includes surfaces 106A to 106H that serve as anchoring surfaces for the movable structure in top layer 100A (FIG. 1A). Specifically, anchors 104A to 104H are bonded to corresponding surfaces 106A to 106H. Cavity 107 accommodates the rotation of scanning mirror 101 without touching bottom layer 100B. In one embodiment, stationary comb teeth 110 provide the electrostatic driving force to drive scanning mirror 101. In another embodiment, stationary comb teeth 110 provide the electrostatic biasing force used to increase the driving efficiency of the movable structure. In yet another embodiment, stationary comb teeth 110 provides both the electrostatic driving force and the electrostatic biasing force. Stationary comb teeth 109 and 110 are interdigitated with rotational comb teeth 108 when viewed from above.

As described above, springs 105A to 105H are distributed along beams 103A and 103B. By carefully adjusting the distribution of the torsional and translational stiffness of these springs, all modal frequencies of the movable structure can be effectively separated and the desired rotational mode can be designed at the lowest resonance frequency. Since the main resonant frequency is the lowest and far apart from other structural modal frequencies, the mirror rotation will not excite any other undesired vibration mode.

Using multiple springs, the maximum stress and strain on each individual spring is noticeably lower than conventional scanning mirror designs supported by only a pair of torsional beams. Therefore, the distributed spring design significantly improves the device reliability. In summary, the system reliability and the servo and the optical performance are all improved with embodiments of the invention.

Figure 2A:
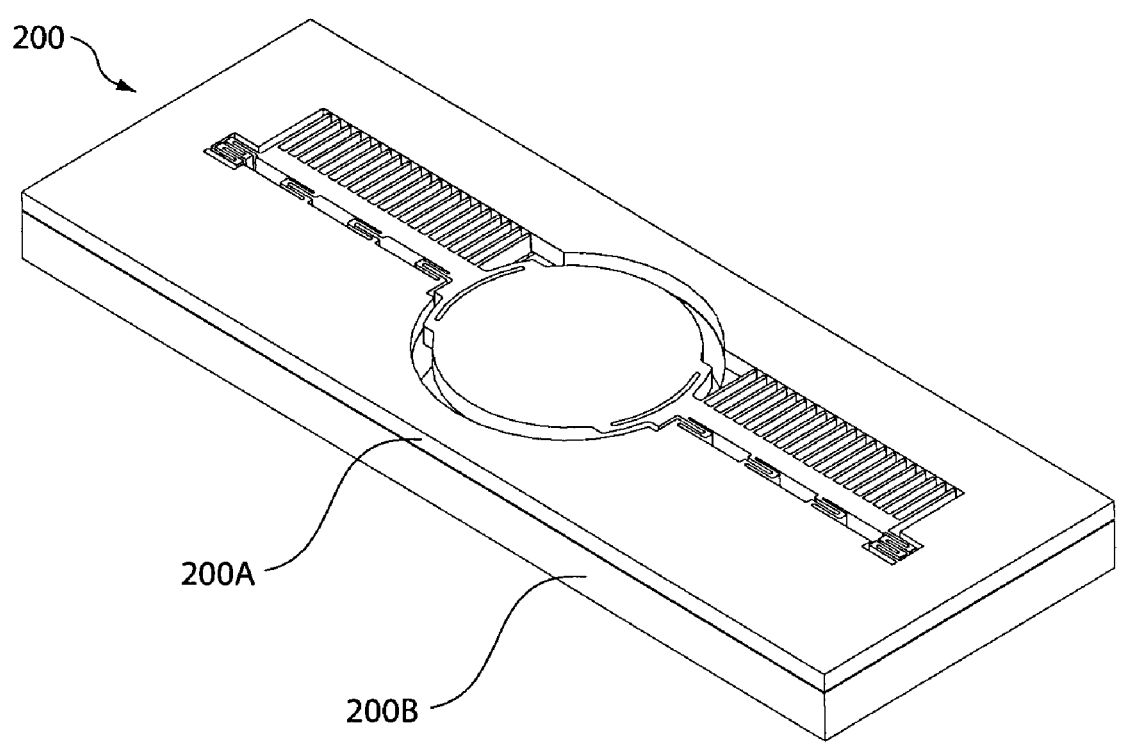
FIGS. 2A, 2B, and 2C illustrate top views of the layers in a MEMS device in another embodiment of the invention.

FIG. 2A illustrates a MEMS scanning mirror device 200 in one embodiment of the invention. Device 200 includes a top layer 200A (FIG. 2B) and a bottom layer 200B (FIG. 2C).

Figure 2B:
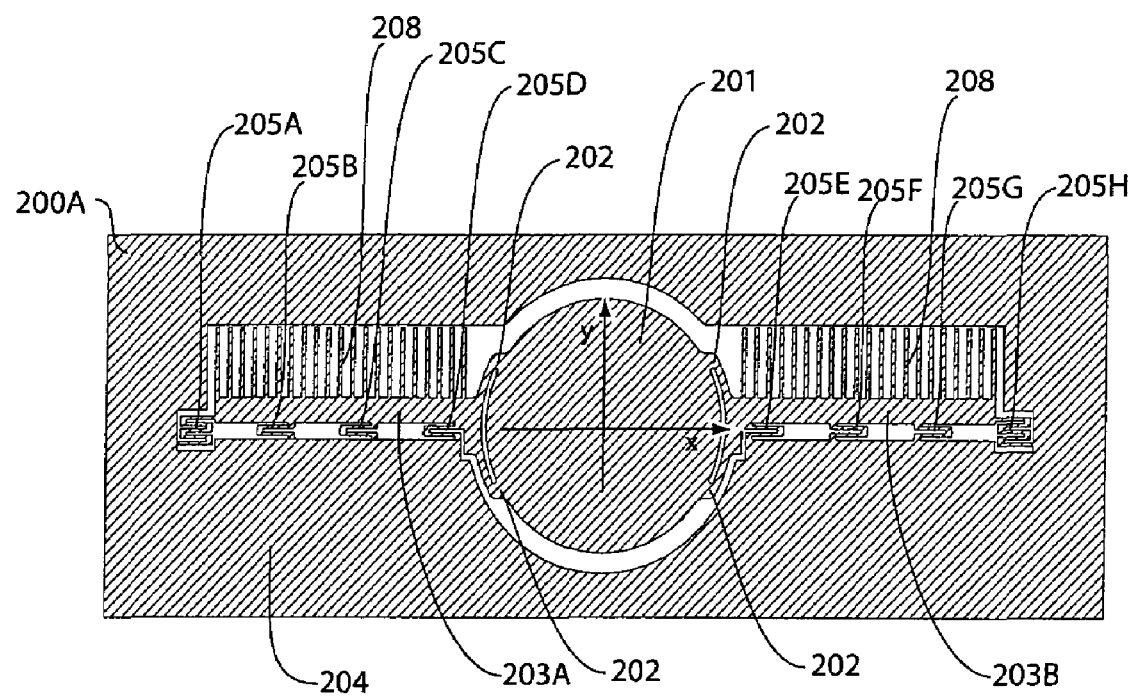

Referring to FIG. 2B, top layer 200A includes a mirror 201 connected by multiple support attachments 202 to beam 203A and 203B. Mirror 201 and support attachments 202 are similar to those shown in FIG. 1B. Rotational comb teeth 208 are connected to one side of beams 203A and 203B.

Beams 203A and 203B are connected by springs/hinges 205A to 205H to stationary surface 204 of top surface 200A in a distributed manner along the rotational axis of scanning mirror 201. Specifically, the distal end of beam 203A is connected by spring/hinge 205A to surface 204, and the distal end of beam 203B is connected by spring/hinge 205H to surface 204. Along their lengths, beam 203A is connected by springs/hinges 205B to 205D to surface 204, and beam 203B is connected by springs/hinges 205E to 205G to surface 204.

Figure 2C:
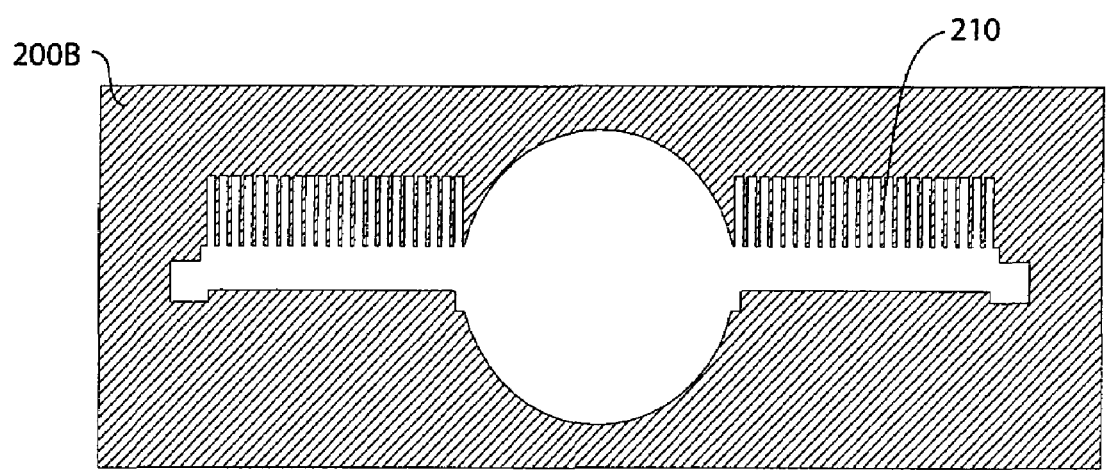

Referring to FIG. 2C, bottom layer 200B includes a cavity 207 that accommodates the rotation of scanning mirror 201 without touching bottom layer 200B. In one embodiment, stationary comb teeth 210 provide the electrostatic driving force to drive scanning mirror 201. In another embodiment, stationary comb teeth 210 provide the electrostatic biasing force used to increase the driving efficiency of the moving structure. In yet another embodiment, stationary comb teeth 210 provides both the electrostatic driving force and the electrostatic biasing. Stationary comb teeth 210 are interdigitated with rotational comb teeth 208 when viewed from above.

Figure 3:
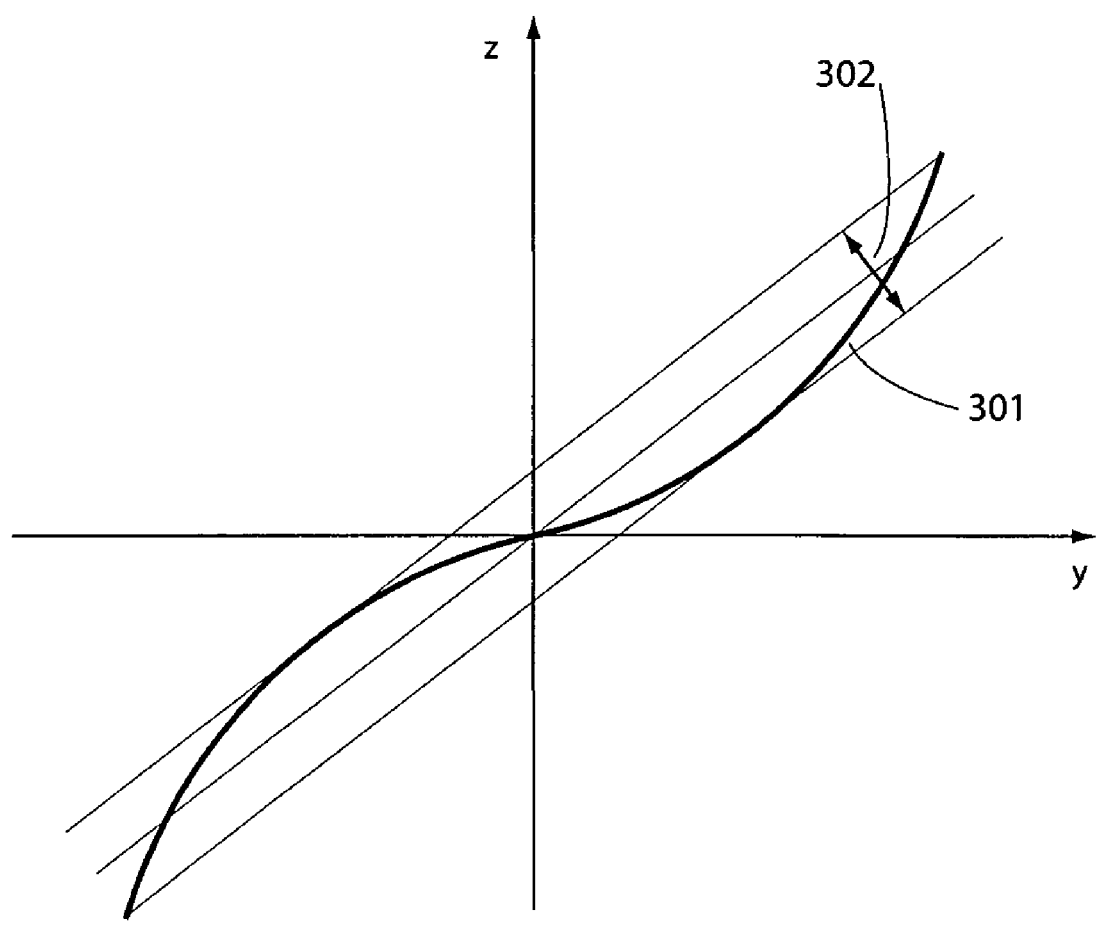
FIG. 3 illustrates a deformation of a scanning mirror in one embodiment of the invention.

FIG. 3 shows a typical mirror dynamic deformation of a mirror 301. Mirror 301 rotates along the x-axis, which points in or out of the page. The total mirror dynamic deformation 302 is shown. The x-axis and the y-axis form a plane where the original mirror surface resides. The z-axis is used to describe the mirror out-of-plane motion. The mirror dynamic deformation is a function of mirror thickness, scanning frequency, mirror size, and rotation angle. The peak-to-peak dynamic deformation has to be smaller than one fourth of the wavelength to prevent diffraction from limiting the optical performance of the scanning mirror. It is estimated that the proposed mirror attachment structures and methods shown in FIGS. 1A and 2A reduce the mirror dynamic deformation up to 50 percents.

Various other adaptations and combinations of features of the embodiments disclosed are within the scope of the invention. For example, although scanning mirror 201 is driven by stationary out-of-plane teeth 210, one can modify the embodiments of the invention so scanning mirror 201 is driven by stationary in-plane teeth. Numerous embodiments are encompassed by the following claims.

What is claimed is:

1. A micro-electro-mechanical system (MEMS) scanning mirror device, comprising:
    a scanning mirror;
    a beam structure extending from one end at the scanning mirror to another end spaced from the scanning mirror, the beam structure having its one end connected to a plurality of locations on the scanning mirror; and
    a spring having one end connected to the beam structure.

2. The device of claim 1, wherein the spring has another end connected to an anchor bonded to a stationary surface.

3. The device of claim 1, wherein the spring has another end connected to a stationary surface.

4. The device of claim 1, further comprising:
    a plurality of rotational comb teeth connected to the beam structure; and
    a plurality of stationary comb teeth, wherein the stationary comb teeth and the rotational comb teeth are interdigitated.

5. The device of claim 1, further comprising:
    at least one additional spring having one end connected to the beam structure along a rotational axis of the scanning mirror.

6. The device of claim 5, wherein the additional spring has another end connected to a corresponding anchor bonded to a corresponding stationary surface.

7. The device of claim 5, wherein the additional spring has another end connected to a stationary surface.

8. The device of claim 1, wherein the device is part of a system selected from the group consisting of a barcode reader, a printer, a confocal microscope, a display, a TV, and a wearable display.

9. The device of claim 1, further comprising an additional beam structure extending from one end at the scanning mirror to another end spaced from the scanning mirror.

10. The device of claim 9, wherein the one end of the additional beam structure is connected to an additional plurality of locations on the scanning mirror.

11. The device of claim 9, further comprising an additional spring having one end connected to the additional beam structure.

12. A micro-electro-mechanical system (MEMS) scanning mirror device, comprising:
    a scanning mirror;
    a beam structure having one end connected to the scanning mirror the, beam structure extending to another end spaced from the scanning mirror; and
    a plurality of torsion springs each having one end connected to the beam structure, wherein the torsion springs are aligned along a rotational axis of the scanning mirror with at least one torsion spring located between another torsion spring and the scanning mirror.

13. The device of claim 12, wherein at least one of the plurality of torsion springs has another end connected to a corresponding anchor bonded to a corresponding stationary surface.

14. The device of claim 12, wherein at least one of the plurality of torsion springs has another end connected to a stationary surface.

15. The device of claim 12, further comprising:
    a plurality of rotational comb teeth connected to the beam structure; and
    a plurality of stationary comb teeth, wherein the stationary comb teeth and the rotational comb teeth are interdigitated.

16. The device of claim 12, wherein the one end of the beam structure is connected to a plurality of locations on the scanning mirror.

17. The device of claim 12, wherein the device is part of a system selected from the group consisting of a barcode reader, a printer, a confocal microscope, a display, a TV, and a wearable display.

18. The device of claim 12, further comprising an additional beam structure extending from one end at the scanning mirror to another end spaced from the scanning mirror.

19. The device of claim 18, further comprising a plurality of additional torsion springs each having one end connected to the additional beam structure.

20. A micro-electro-mechanical system (MEMS) scanning mirror device, comprising:
  a scanning mirror;
  a beam structure having one end connected to the scanning mirror, the beam structure extending to another end spaced from the scanning mirror; and
  a plurality of springs connected to the beam structure along its length, wherein the springs provide restoring torque at spaced positions along a rotational axis of the scanning mirror with at least one spring located between another spring and the scanning mirror.

21. The device of claim 20, wherein the springs are further connected to corresponding anchors bonded to a corresponding stationary surface.

22. The device of claim 20, wherein the springs are further connected to a stationary surface.

23. The device of claim 20, wherein the device is part of a system selected from the group consisting of a barcode reader, a printer, a confocal microscope, a display, a TV, and a wearable display.

24. The device of claim 20, wherein the one end of the beam structure is connected to a plurality of locations on the scanning mirror.

25. The device of claim 24, further comprising:
  a plurality of rotational comb teeth connected to the beam structure; and
  a plurality of stationary comb teeth, wherein the stationary comb teeth and the rotational comb teeth are interdigitated.

26. A micro-electro-mechanical system (MEMS) scanning mirror device, comprising:
  a scanning mirror;
  first and second beam structures, each extending from a respective proximal end at the scanning mirror to a respective distal end spaced from the scanning mirror, at least one of the beam structures being connected at its proximal end to a plurality of locations on the scanning mirror; and
  a spring having one end connected to at least one of the beam structures.

27. A micro-electro-mechanical system (MEMS) scanning mirror device, comprising:
  a scanning mirror;
  first and second beam structures, each connected at a respective proximal end to the scanning mirror and extending to a respective distal end spaced from the scanning mirror; and
  a plurality of torsion springs each having one end connected to the first beam structure, wherein the torsion springs are aligned along a rotational axis of the scanning mirror with at least one torsion spring located between another torsion spring and the scanning mirror.

* * * * *